(12) United States Patent
Ng et al.

(10) Patent No.: US 10,245,820 B2
(45) Date of Patent: Apr. 2, 2019

(54) FORMING SACRIFICIAL STRUCTURES USING PHASE-CHANGE MATERIALS THAT SUBLIMATE

(71) Applicant: Palo Alto Research Center Incorporated, Palo Alto, CA (US)

(72) Inventors: Tse Nga Ng, Sunnyvale, CA (US); Bing R. Hsieh, Pleasanton, CA (US); Steven E. Ready, Los Altos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 129 days.

(21) Appl. No.: 15/391,723

(22) Filed: Dec. 27, 2016

(65) Prior Publication Data

US 2017/0106605 A1  Apr. 20, 2017

Related U.S. Application Data

(62) Division of application No. 14/567,010, filed on Dec. 11, 2014.

(51) Int. Cl.
| | | |
|---|---|---|
| B29C 33/44 | (2006.01) |
| B29C 33/52 | (2006.01) |
| B33Y 10/00 | (2015.01) |
| B29C 64/106 | (2017.01) |
| B29C 64/118 | (2017.01) |
| B29C 64/112 | (2017.01) |
| B29C 64/124 | (2017.01) |
| B29C 64/40 | (2017.01) |
| B29K 75/00 | (2006.01) |

(52) U.S. Cl.
CPC ............. *B33Y 10/00* (2014.12); *B29C 33/448* (2013.01); *B29C 64/106* (2017.08); *B29C 64/112* (2017.08); *B29C 64/118* (2017.08); *B29C 64/124* (2017.08); *B29C 64/40* (2017.08); *B29K 2075/00* (2013.01)

(58) Field of Classification Search
CPC ........ B29C 33/44; B29C 33/448; B29C 33/52; B29C 64/106; B29C 64/112; B29C 64/118; B29C 64/40
USPC .................................................. 264/308, 317
See application file for complete search history.

(56) References Cited

U.S. PATENT DOCUMENTS

| | | | |
|---|---|---|---|
| 6,524,488 B1 | 2/2003 | Insley et al. | |
| 7,850,861 B1 | 12/2010 | Wong | |
| 2003/0148222 A1 | 8/2003 | Bowman et al. | |
| 2004/0115861 A1 | 6/2004 | Wong et al. | |
| 2005/0170670 A1 | 8/2005 | King et al. | |
| 2005/0288813 A1* | 12/2005 | Yang .................... B29C 64/106 700/119 |
| 2006/0096705 A1 | 5/2006 | Shi et al. | |
| 2010/0003619 A1* | 1/2010 | Das ....................... G03B 27/42 430/290 |
| 2014/0231266 A1* | 8/2014 | Sherrer ................ B29C 64/106 205/136 |

* cited by examiner

*Primary Examiner* — Leo B Tentoni
(74) *Attorney, Agent, or Firm* — Miller Nash Graham & Dunn LLP

(57) ABSTRACT

A structure can include a first layer of a polymer material and a second layer of the polymer material on the first layer, the first and second layers of the polymer material defining a hollow space that was formed by way of a temporary sacrificial structure that was made of a sublimable material.

18 Claims, 3 Drawing Sheets

FORMING SACRIFICIAL STRUCTURES USING PHASE-CHANGE MATERIALS THAT SUBLIMATE

CROSS-REFERENCE TO RELATED APPLICATIONS

This application is a division of U.S. Non-Provisional patent application Ser. No. 14/567,010, filed Dec. 11, 2014, entitled FORMING SACRIFICIAL STRUCTURES USING PHASE-CHANGE MATERIALS THAT SUBLIMATE, the disclosure of which is incorporated herein by reference in its entirety.

TECHNICAL FIELD

The disclosed technology relates generally to the field of forming sacrificial structures and, more particularly, to forming sacrificial structures using phase-change materials that sublimate.

BACKGROUND

In today's layer-by-layer printing techniques for forming three-dimensional (3D) structures, sacrificial materials are generally needed to form temporary support structures that are later removed to leave behind voids or channels. Typical sacrificial materials include polymers or waxes that are dissolvable by solvents or can be decomposed by high-temperature annealing. However, such removal procedures can disadvantageously cause problems arising from stiction (e.g., static friction that needs to be overcome to enable relative motion of stationary objects in contact) resulting from capillary force during washing. These removal procedures may also undesirably cause decomposition residues to be left behind.

SUMMARY

According to aspects illustrated herein, there is provided a structure comprising a first layer of a polymer material and a second layer of the polymer material on the first layer, the first and second layers of the polymer material defining a hollow space that was formed by way of a temporary sacrificial structure that was made of a sublimable material such as cyclododecane and then removed. This process may be repeated any of a number of times, e.g., to build up layered structures having multiple hollow spaces.

DETAILED DESCRIPTION

Embodiments of the disclosed technology generally pertain to the use of a sacrificial material that can be removed by sublimation, accelerated by heat and/or a low pressure environment. Such embodiments generally do not rely on the use of solvents to wash off the sacrificial materials, thus simplifying the removal process as compared to the decomposition of polymers that requires high temperature burning, for example.

Certain embodiments of the disclosed technology generally include the use of materials that can be sublimated at low temperature (e.g., less than 160 degrees Celsius) as the sacrificial structures. Use of such materials may advantageously avoid the use of a solvent or high temperature decomposition during the removal process. Phase-change material may be deposited as a liquid, and the liquid state may fill in empty spaces and subsequently solidify to enable temporary planarization.

Certain embodiments of the disclosed technology may include the use of cyclododecane, which is a hydrocarbon having a melting point around 58-60 degrees Celsius and high vapor pressure that allows sublimation thereof at low temperature. The phase-change material may be heated to its liquid state for deposition, and then solidify upon contacting a surface below its melting point.

As cyclododecane has high vapor pressure (e.g., approximately 10 Pa), it may typically be sublimated at room temperature, though generally at slow rate. In certain embodiments, material removal may be accelerated by heating the structure in a low vacuum oven (e.g., 1 millitorr or mTorr) at a certain temperature (e.g., approximately 55 degrees Celsius). In such embodiments, the sacrificial cyclododecane may be sublimated within minutes, depending on the volume of materials.

FIGS. 1-4 together illustrate an example in which a sacrificial material is used with an ultraviolet (UV)-curable polymer (e.g., polyurethane) to form a three-dimensional (3D) structure having a cavity or hollow space therein in accordance with certain embodiments of the disclosed technology.

Figure 1:
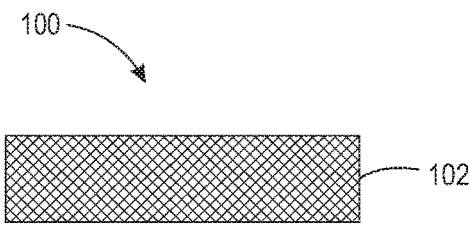
FIG. 1 is a block diagram illustrating the depositing and crosslinking of a photonic curable polymer material, such as UV-curable polymers and composites, in accordance with certain embodiments of the disclosed technology.

FIG. 1 is a block diagram 100 illustrating the depositing and crosslinking of a UV-curable polymer material and/or other composites 102.

Figure 2:
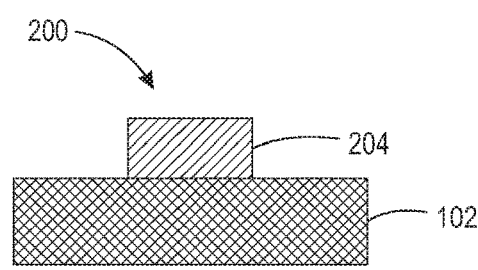
FIG. 2 is a block diagram illustrating the depositing of a sacrificial material (e.g., cyclododecane) from its liquid state on top of the layer of UV-crosslinked polymer material illustrated by FIG. 1 in accordance with certain embodiments of the disclosed technology.

FIG. 2 is a block diagram 200 illustrating the depositing of a sacrificial ink or other suitable material 204 (e.g., cyclododecane) from its liquid state on top of the layer of UV-crosslinked polymer material 102 illustrated by FIG. 1. The sacrificial material 204 then solidifies into a sacrificial structure.

Figure 3:
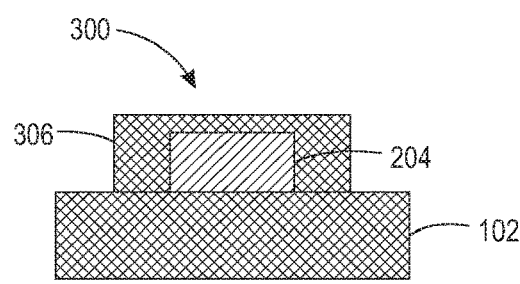
FIG. 3 is a block diagram illustrating the depositing of a second layer of UV-curable polymer material to cover the sacrificial structure on the first layer of UV-curable polymer material as illustrated by FIG. 2 in accordance with certain embodiments of the disclosed technology.

FIG. 3 is a block diagram 300 illustrating the depositing of a second layer of UV-curable polymer material 306 to cover the sacrificial structure 204 on the first layer of UV-curable polymer material 102 as illustrated by FIG. 2. This second layer of UV-curable polymer material 306 may be subsequently cross-linked.

The entire structure illustrated by FIG. 3 may be placed in a vacuum oven at a certain temperature (e.g., 55 degrees Celsius) and at a certain pressure (e.g., approximately 1 millitorr or mTorr). The sacrificial material 204 may then be removed (e.g., by sublimation), leaving behind a structure having a channel 408 defined therein as illustrated by the block diagram 400 of FIG. 4.

The sacrificial ink used in the example illustrated by FIGS. 1-4 may be composed of neat cyclododecane with no solvent, but the cyclododecane [or other sublimable material(s)] may also be mixed with an organic solvent, such as toluene or acetone, for example, in order to change the viscosity for different deposition methods. While mixing solvent with the sacrificial material may result in a structural shrinkage issue when the solvent evaporates, this potential issue may be addressed by programming the printing tool to compensate for the dimensional change.

Figure 5:
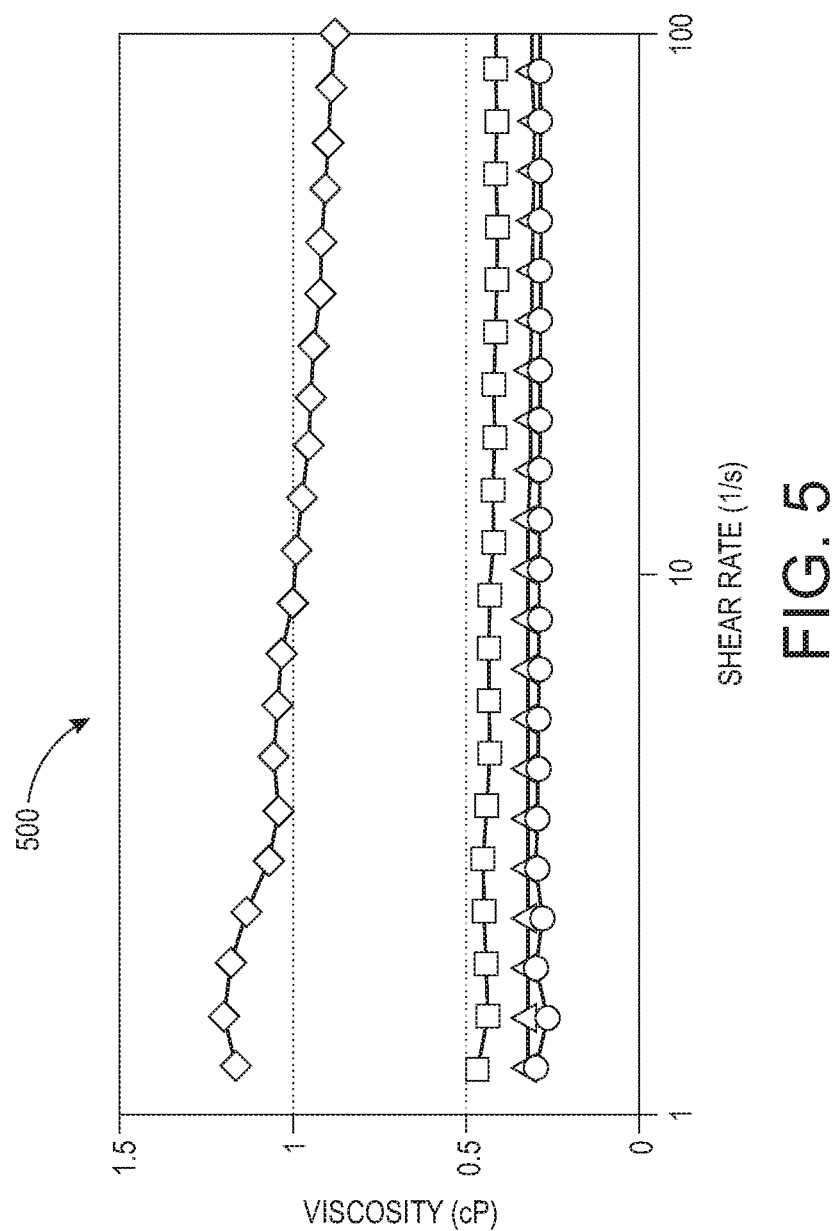
FIG. 5 is a graphical representation illustrating an example of the viscosity versus shear rate data for cyclododecane.

FIG. 5 is a graphical representation 500 illustrating an example of the viscosity versus shear rate data for cyclododecane.

Figure 6:
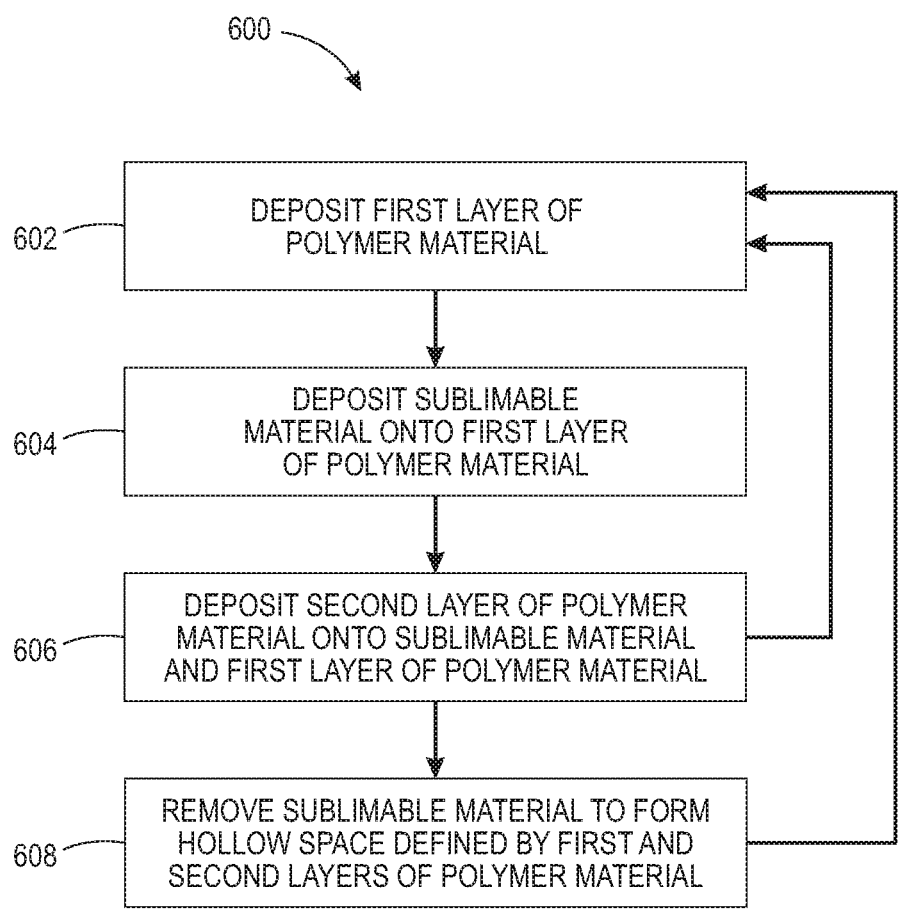
FIG. 6 is a flowchart illustrating an example of a method of creating a structure in accordance with certain embodiments of the disclosed technology.

FIG. 6 is a flowchart illustrating an example of a method 600 of creating a structure in accordance with certain embodiments of the disclosed technology.

At 602, a first layer of a polymer material, such as the ultraviolet (UV)-curable polymer material 102 illustrated by FIGS. 1-4, may be deposited, e.g., onto a substrate. The polymer material may also be crosslinked.

At 604, a sublimable material, such as the sacrificial material 204 illustrated by FIGS. 2 and 3, may be deposited onto the first layer of the polymer material. The sublimable material, such as cyclododecane, may be deposited from its liquid state and subsequently solidify into a sacrificial structure.

Figure 4:
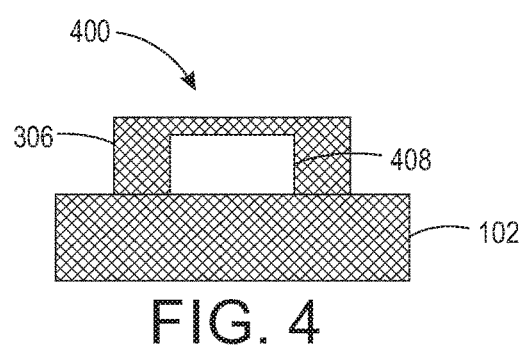
FIG. 4 is a block diagram illustrating a three-dimensional (3D) structure having a channel or hollow space defined therein in accordance with certain embodiments of the disclosed technology.

At 606, a second layer of the polymer material, such as the UV-curable polymer material 306 illustrated by FIGS. 3 and 4, may be deposited to cover the sacrificial structure and first layer polymer material. This second layer of polymer material may also be subsequently cross-linked. The process from 602 to 606 may be repeated any of a number of times, e.g., to build multiple-layered structures having multiple hollow spaces defined therein.

At 608, the sublimable material may be removed, e.g., by a sublimation process, to form a hollow space, such as the channel 408 illustrated by FIG. 4, defined by the first and second layers of polymer material. For example, the entire structure may be placed in a vacuum oven at a certain temperature (e.g., approximately 120 degrees Celsius) and at a certain pressure (e.g., approximately 1 millitorr or mTorr). The process from 602 to 608 may be repeated any of a number of times, e.g., to build multiple-layered structures having multiple hollow spaces defined therein.

Materials having different vapor pressure may be chosen to form sacrificial structures that are sequentially removed. For example, if a certain structural part is to be released before another, the first part may be patterned by a sacrificial material having a certain vapor pressure and the second part to be released may be patterned using a sacrificial material having a vapor pressure that is lower than that of the first sacrificial material.

In addition to patterning a sacrificial material in a layer-by-layer manner, the material may also be deposited into a well structure in order to fill in the empty space and hence provide temporary structural support.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method, comprising:
depositing a first layer of a polymer material;
depositing a first amount of sublimable material on the first layer of the polymer material to form a first sacrificial structure, wherein the sublimable material includes cyclododecane;
depositing a second layer of the polymer material on the first amount of sublimable material and first layer of the polymer material; and
removing the sublimable material to form a channel defined by the first and second layers of the polymer material.

2. The method of claim 1, wherein the removing includes performing sublimation.

3. The method of claim 2, wherein the sublimation includes heating at a certain temperature and at a certain pressure.

4. The method of claim 3, wherein the certain pressure is approximately 1 millitorr.

5. The method of claim 3, wherein the certain temperature is less than 160 degrees Celsius.

6. The method of claim 5, wherein the certain temperature is approximately 55 degrees Celsius.

7. A method, comprising:
depositing a first layer of a polymer material;
depositing a first amount of sublimable material on the first layer of the polymer material to form a first sacrificial structure;
depositing a second layer of the polymer material on the first amount of sublimable material and first layer of the polymer material;
removing the first amount of sublimable material to form a first hollow space defined by the first and second layers of the polymer material;
depositing a second amount of sublimable material on the first layer of the polymer material to form a second sacrificial structure;
depositing a third layer of the polymer material on the second amount of sublimable material and first layer of the polymer material; and
removing the sublimable material to form a second hollow space defined by the first and third layers of the polymer material.

8. A method, comprising:
depositing a first layer of a polymer material;
depositing a first amount of sublimable material on the first layer of the polymer material to form a first sacrificial structure;
depositing a second layer of the polymer material on the first amount of sublimable material and first layer of the polymer material;
removing the first amount of sublimable material to form a first hollow space defined by the first and second layers of the polymer material;
depositing a second amount of sublimable material on the second layer of the polymer material to form a second sacrificial structure;
depositing a third layer of the polymer material on the second amount of sublimable material and second layer of the polymer material; and removing the second amount of sublimable material to form a second hollow space defined by the second and third layers of the polymer material.

9. The method of claim 7, wherein removing either or both of the first and second amounts of sublimable material includes performing sublimation.

10. The method of claim 9, wherein the sublimation includes heating at a certain temperature and at a certain pressure.

11. The method of claim 10, wherein the certain pressure is approximately 1 millitorr.

12. The method of claim 10, wherein the certain temperature is less than 160 degrees Celsius.

13. The method of claim 7, wherein either or both of the first and second amounts of sublimable material includes cyclododecane.

14. The method of claim 7, wherein removing either or both of the first and second amounts of sublimable material includes performing sublimation.

15. The method of claim 14, wherein the sublimation includes heating at a certain temperature and at a certain pressure.

16. The method of claim 15, wherein the certain pressure is approximately 1 millitorr.

17. The method of claim 15, wherein the certain temperature is less than 160 degrees Celsius.

18. The method of claim 8, wherein either or both of the first and second amounts of sublimable material includes cyclododecane.

* * * * *